United States Patent [19]

Spanswick

[11] 3,957,915
[45] May 18, 1976

[54] TRANSLUCENT IMPACT POLYSTYRENE
[75] Inventor: James Spanswick, Wheaton, Ill.
[73] Assignee: Standard Oil Company, Chicago, Ill.
[22] Filed: Apr. 30, 1975
[21] Appl. No.: 573,311

[52] U.S. Cl. .................... 260/880 R; 260/45.7 R;
260/45.85 R
[51] Int. Cl.² .......................................... C08L 9/06
[58] Field of Search ..... 260/880 R, 45.7 R, 45.85 R Primary Examiner—Paul R. Michl
Attorney, Agent, or Firm—Wallace L. Oliver; Arthur G. Gilkes; William T. McClain

[57] ABSTRACT

Translucent rubber-modified styrene polymers are prepared by adding 0.005 to 0.5% of 1,2-dibromo-2-phenylpropane or methyl-2,3-dibromo-3-phenylpropionate to the polymerization feedstock.

10 Claims, No Drawings

TRANSLUCENT IMPACT POLYSTYRENE

BACKGROUND OF THE INVENTION

This invention relates to translucent rubber-modified styrene polymers which contain bromine compounds.

There is a need for impact resistant styrene polymers which are translucent or transparent. Impact resistance now is imparted to styrene polymers by polymerizing styrene in the presence of 3 to 10% of various rubber compounds such that discrete rubber-polystyrene phases are incorporated with in a styrene homoplymer matrix. Unfortunately for some applications, these rubber-modified styrene polymers usually are opaque. To be commercially acceptable, a suitable translucent impact resistant polystyrene should have a notched Izod value of at least 0.6 foot-pound/inch of notch and a translucency index of at least 7 on a scale from 1 to 10.

One approach to this problem is described in British Pat. No. 1,185,122 which recommends the addition of 0.05 to 2% of β-bromostyrene to the polymerization feedstock in order to produce a transparent rubber-modified polystyrene. However, polymeric compositions produced using the method disclosed in this British Patent can have an undesirable brownish color.

It is an object of this invention to produce an impact resistant translucent styrene polymer. Another object of this invention is to produce such a polymer which is not discolored. Still another object of this invention is to provide bromine compounds which can be added to a styrene polymerization feedstock in low concentration providing an impact resistant translucent polymer and which will not corrode a polymerization reactor vessel.

SUMMARY OF THE INVENTION

My invention is a method for producing translucent, impact resistant polymers comprising the steps:
 a. adding to a polymerization feedstock, comprising 2 to 20% rubber dissolved in a vinyl aromatic, an effective amount between 0.005 to 0.5 weight percent of an additive selected from the group consisting of 1,2-dibromo-2-phenylpropane and methyl-2,3-dibromo-3-phenylpropionate;
 b. polymerizing the feedstock; and
 c. recovering the polymer,
whereby the Izod value of the polymer is at least 0.6 and the translucency index of the polymer is at least 7.

DESCRIPTION OF THE INVENTION

I have found that the translucence of rubber-modified vinyl aromatic polymers can be improved significantly by the incorporation of small amounts of certain bromine-containing compounds in the polymerization feedstock. Specifically, I find that incorporation of low, but effective, levels of 1,2-dibromo-2-phenylpropane (DBPP) or methyl-2,3-dibromo phenylpropionate (MDPP) into a styrene-rubber polymerization feedstock yields a sufficiently translucent impact styrene polymer. The additive, 1,2-dibromo-2-phenylpropane, is preferred because it appears to be effective at a lower concentration.

The mechanism of the observed effect remains uncertain. One theory is that chain transfer activity is involved in translucency improvement. It was observed that many polymerization runs in which translucency was improved involved additives which are probable good chain transfer agents. Similarly, additives which are less effective, such as the aryl bromides, have low chain transfer constants. However, if the bromine effect is due simply to chain transfer activity, some effect might be observed using other chain transfer agents. A styrene-rubber polymerization run was made using 0.005 mol n-dodecylmercaptan. Although this mercaptan level was higher than the bromine runs and although mercaptan has a higher chain transfer constant than most bromine additives, no increase in translucency was observed in the mercaptan run. It is believed that when a mercaptan is involved in a chain transfer, the active site is destroyed while with bromine additive there is persistent chain transfer activity.

In gel tests carried out by the method described in Ruffing U.S. Pat. No. 3,243,481, the level of dry gel in a typical run made without bromine is two to three times the rubber level, while in runs with bromine-containing additives present, the dry gel level is three to four times the rubber level. The higher level of dry gel in the bromine runs indicates that these runs contain more entrapped and/or grafted polystyrene. The higher level of entrapped polystyrene is also evident in electron photomicrographs. Comparing photomicrographs of runs made with and without a bromine additive, in bromine-containing runs the particles have relatively more entrapped polystyrene, thinner rubber walls, and a more uniform, cellular rubber structure. The Ruffing gel data and the electron micrographs, therefore, both indicate that there is more entrapped polystyrene in the rubber particles in bromine runs. One explanation of this data is that the increased translucency in bromine runs is caused by the alteration in particle morphology.

An alternate explanation for the bromine effect arises from the appearance of phase contrast photomicrographs. In bromine runs with improved translucency, the contrast is noticeably less than in runs made without bromine. This observation suggests that the refractive index of the rubber increased in bromine runs, thereby decreasing the difference between the refractive index of the rubber and the polystyrene. This increase in rubber refractive index could be brought about by increased grafting and crosslinking in the presence of bromine. Increased grafting would serve to explain the change in particle morphology and the increase in gel content caused by bromine, while an increase in crosslinking would reduce the difference in refractive indices between the two phases.

Still another possibility which has been considered is that the bromine itself either decreases the refractive index of the polystyrene or increases the refractive index of the rubber. That the former is not true was demonstrated by isolating the matrix from six of the runs. The refractive indices of these matrices were essentially the same as that of unmodified polystyrene.

It was similarly shown that the refractive index of the rubber is not increased by bromine per se. Refractive indices were determined for four brominated rubbers and were found to be similar to those of the raw rubber. The rubbers used in this test were Goodyear 1288 and Firestone Diene 55.

In summary, three possible explanations have been considered for the increases in translucency observed in certain bromine runs. One favored explanation is that the change in rubber particle morphology causes the change in translucency. Another possibility is that the refractive index of the rubber is increased by grafting and/or crosslinking, thereby decreasing the difference in refractive index between the rubber and the polystyrene. The third possibility, that the difference in refractive index between polystyrene and rubber is decreased directly by incorporation of bromine into polystyrene and/or rubber, is improbable.

The addition of a combined chain transfer agent/retarder after phase inversion to a polymerizing rubber modified system results in an increase in the volume fraction of the rubber phase over a control run without such an addition. Examples of chain transfer agents/retarders are bromocompounds, such as 1,2-dibromo-2-phenylpropane and methyl-2,3-dibromophenylpropionate, although other compounds are known to exert similar effects on free radical initiated vinyl-system polymerizations. The additive effects the polymerizing system by reducing the rate of polymerization in the matrix only, and by causing the formation of polymer of lower molecular weight in the matrix. The combined effect is to reduce both the shear stress on the rubber particle by a reduction in the viscosity of the system, and to more closely match the rate of polymerization of the matrix polymer-monomer phase to the occluded polymer-monomer phase. This reduction in the rate of polymerization of the matrix polymer-monomer solution will reduce the concentration gradient between the occluded material and the continuous phase. The driving forces towards rubber enrichment of the rubber particles are, therefore, reduced and larger rubber particles for a given amount of rubber in the particle are obtained. This results in a more efficient use of the rubber as more rubber particles of a given size can be formed from a constant amount of feedstock rubber. As the physical properties are dependent on the morphology of the rubber particle all physical properties should be improved. Izod values are very dependent on the volume fraction of the dispersed phase and a final Ruffing gel to initial rubber ratio of greater than six can be obtained before the effect of overfilling the rubber with polymer causes a drop in Izod. Up to this ratio all increases in gel/rubber should result in an increase in Izod. The other physical properties such as tensile strength and heat distortion will be improved as the gel/rubber ratio is increased for a given level of rubber. It is this higher gel/rubber ratio in laboratory prepared samples when compared to commercial samples that results in better physical properties for laboratory prepared polymer.

In selecting a bromine containing additive which is useful in producing translucent impact polystyrene several competing factors must be weighed. Both the translucence level and toughness must be adequate. Further, neither should there be any discoloration due to the bromine nor should the bromo compound corrode the reactor vessel. Another important consideration is that the effective concentration of the additive be as low as possible. I tested the additives of my invention against many other bromine-containing compounds and determined that my additives are effective and superior to the other tested compounds. At the concentration of additives proscribed there was neither discoloration of the impact resistant polymer nor surprisingly was there any detectable corrosion of the reactor vessel.

The levels at which the additives of my invention are effective range from about 0.005 to 0.5 weight percent of the rubber and styrene in the polymerization feedstock and preferably from about 0.005 to 0.1%. At a rubber concentration of four percent, preferably the additive concentration of the DBPP should be about 0.005 to 0.10% and optimumly about 0.008%. Also at a rubber content of 4%, the concentration of MDPP should be about 0.01 to 0.04% and preferably about 0.025%. Although these percentages are believed optimum for the polymerization conditions tested, it is not possible to give the optimum concentration for all reaction conditions and polymer compositions. For example, if the percent of rubber is increased the amount of additive can be increased without decreasing the impact characteristics below an unacceptable level. Further, the type of rubber that is used will affect the balance between impact strength and translucency. However, within the broad range of 0.005 to 0.5% of my additives there should be an effective concentration at which the resulting styrene polymer has improved translucency and impact properties.

Although styrene is the preferred monomer in my invention other vinyl aromatic monomers such as alpha-methylstyrene can be used in conjunction with my additives. Rubbers which can be used in impact resistant polymers include polybutadiene (PBD) and styrene-butadiene (SBR) rubber prepared by solution or emulsion methods. Typically, useful PBD rubbers are linear and branched polymers of butadiene containing from 25 to 99% cis content with less than 20% free vinyl unsaturation (i.e., 1, 2-addition). A commonly used PBD would contain 55% trans, 35% cis and 10% free vinyl unsaturation. Solution viscosities for useful PBD's range from 25 to 220 centipoise and preferably range from 70 to 190 centipoise measured at a concentration of 5% by weight in styrene at 30°C. Useful SBR rubbers are random or block copolymers of butadiene and styrene, or combinations thereof, with 5 to 50% bound styrene. Typical solution viscosities are 20 to 190 centipoise and typical Mooney viscosities are 30 to 120. These rubbers can be present in styrene polymer at levels from about 2 to 20% and typically from about 3 to 10%.

In addition to the vinyl aromatic monomer and rubber, up to about 10% of other materials can be included in the polymerization feedstock, such as stabilizers, antioxidants, colorants, flame retardants, and lubricants.

In testing bromine-containing additives in impact polystyrene, the general mass thermal polymerization procedure was to prepare about 2000 grams of feedstock by dissolving rubber and additives in styrene monomer. This feedstock was placed in an agitated ½ gallon Chemco reactor for about 6 to 9 hours during which time the temperature ranged from about 120° to 210°C. The polymer was removed from the reactor, ground up and passed through a devolatilizing extruder.

Translucency was measured by making a compression molded chip of polymer of about 50 mils thickness and placing it in contact with a printed sheet of paper. The clarity of the printing as viewed through the chip is a measure of "contact" translucency. Using this method samples are ranked in clarity from 1 to 10, with crystal polystyrene ranking 10 and a sample through which the printing is barely discernable ranking 1. Monsanto styrene polymer LP-61 ranks 7. A polymer with a ranking of 7 has a luminous transmittance value over about 68%.

In these tests 1,2-dibromo-2-phenylpropane was prepared by bromination of alpha-methylstyrene in hexane solution and methyl-2,3-dibromo-3-phenylpropionate was prepared by bromination of methyl cinnamate in carbon tetrachloride solution.

venient particle size. The results of my tests are summarized in TABLE I.

TABLE I

| EXAMPLE (RUN) | Additive Type | Wt.% Additive | Wt.% Br in feed | Wt.% Rubber (Rubber Type)[1] | Trans-lucency | Color[2] | ASTM Izod[3] | Elongation[4] | YTS[5] | UTS[6] | HDT[7] | MFR[8] |
|---|---|---|---|---|---|---|---|---|---|---|---|---|
| EX. I | DBPP | 0.008 | 0.004 | 4.0 (55) | 7 | GC | 0.94 | 11 | 5200 | 4800 | 186 | 3.3 |
| Run 1 | DBPP | 0.015 | 0.009 | 4.0 (55) | 8 | GC | 0.33 | 6.0 | 6200 | 6600 | 175 | 3.8 |
| Run 2 | DBPP | 0.04 | 0.025 | 4.0 (55) | 9 | DC | 0.12 | 1.0 | 4500 | 4500 | 169 | 10 |
| Ex. II | DBPP | 0.005 | 0.003 | 5.6 (55) | 6 | GC | 0.8 | 25 | 4000 | 3900 | 176 | 5.2 |
| Run 3 | DBPP | 0.0075 | 0.004 | 7 (55) | 5 | GC | 1.06 | 37 | 3700 | 3800 | 181 | 3.3 |
| Ex. III | MDPP | 0.025 | 0.013 | 4.0 (55) | 7 | GC | 0.91 | 41 | 4600 | 4900 | 179 | 3.9 |
| Run 4[9] | β-bromo-styrene | 1.0 | 0.44 | 4.0 (300) | — | — | — | — | — | — | — | — |
| Run 5 | β-bromo-styrene | 0.1 | 0.044 | 4.0 (700) | 9 | SDC | 0.25 | 2 | 6000 | 6000 | 175 | 7.9 |
| Run 6 | β-bromo-styrene | 0.1 | 0.044 | 8.0 (55) | 8 | SDC | 1.03 | <50 | 3400 | 2400 | 155 | 4.5 |
| Run 7[9] | β-bromo-α-methyl-styrene | 0.1 | — | 4.0 (55) | — | — | — | — | — | — | — | — |
| Run 8 | 4-bromo-styrene | 0.5 | 0.22 | 4.0 (55) | 4 | GC | 1.12 | 42 | 5000 | 5000 | 186 | 2.4 |
| Run 9 | β-bromo-ethyl methacrylic | 0.25 | 0.10 | 4.0 (55) | 6 | GC | 0.45 | 14 | 4300 | 4200 | 185 | 2.2 |
| Run 10 | β-bromo-α-methyl-styrene | 0.015 | 0.006 | 4.0 (55) | 6 | GC | 0.88 | 37 | 4800 | 5000 | 183 | 2.8 |
| Run 11 | 2-bromo ethyl-benzene | 0.05 | 0.022 | 4.0 (55) | 4 | GC | 1.12 | 35 | 5300 | 5100 | 189 | 2.8 |
| Run 12 | α,β-di-bromo-ethyl-benzene | 0.05 | 0.03 | 4.0 (55) | 7 | DC | 0.86 | 39 | 4400 | 4800 | 174 | 4.6 |
| Run 13 | β-bromo-styrene | 0.025 | 0.011 | 4.0 (55) | 6 | GC | 1.1 | 40 | 4800 | 4900 | 181 | 3.7 |
| Run 14 | 2-bromo-indene | 0.03 | 0.012 | 4.0 (55) | 6 | GC | 0.58 | 6.3 | 4300 | 4000 | 178 | 8.6 |
| Run 15 | cinnamyl bromide | 0.04 | 0.015 | 4.0 (55) | 5 | SDC | 1.06 | 23 | 5100 | 4900 | 188 | 4.8 |
| Run 16 | 1-bromo-2-butene | 0.025 | 0.015 | 4.0 (55) | 5 | SDC | 1.07 | 31 | 4800 | 4900 | 184 | 3.6 |
| Run 17 | 3-bromo-cyclohexane | 0.03 | 0.015 | 4.0 (55) | 8 | GC | 0.32 | 12 | 5900 | 5100 | 181 | 3.0 |
| Run 18 | 2-bromo-ethyl-benzene | 0.05 | 0.022 | 4.0 (55) | 5 | GC | 0.71 | 13 | 4600 | 4400 | 185 | 6.0 |
| Run 19 | — | 0 | 0 | 4.0 (55) | 4 | GC | 1.31 | 20 | 5400 | 5100 | 188 | 1.9 |
| Run 20 | β-bromo-α-methyl-styrene | 0.015 | 0.006 | 8.0 (55) | 6 | — | 1.34 | 46 | 2800 | 2900 | 181 | 3.3 |
| Run 21 | 4-bromo-biphenyl | 3.0 | 1.0 | 6.5 (5001) | 4 | — | 1.33 | 31 | 4400 | 4100 | 167 | 4.0 |

[1] 55 is Firestone Diene 55, a solution PBD
5001 is Goodyear 5001, an emulsion PBD
300 is Phillips Solprene 300, 25% styrene SBR
700 is Firestone Stereon 700, a solution SBR, 20% styrene SBR
[2] GC = Good Color
SDC = Slight Discoloration
DC = Discoloration
[3] (ft-lb/in of notch) ASTM D256-70 (¼ inch bar)
[4] (%) ASTM 0638-68 (Type I at 0.2 in/min)
[5] YTS = Yield Tensile Strength (lb/in²) ASTM 0638-68 (Type I at 0.2 in/min)
[6] UTS = Ultimate Tensile Strength (lb/in²) ASTM 0638-68 (Type I at 0.2 in/min)
[7] HDT = Heat Distortion Temp (°F.) ASTM 0648-56 (¼ in. bar at 264 psi)
[8] MFR = Melt Flow Rate g/10 min. ASTM D1238-70 (Condition G)
[9] Polymer discarded due to low molecular weight of the matrix The testing procedure used the mass thermal polymerization technique, although my invention is not limited to any specific method of polymerization. Another conventional polymerization method in which the additives of my invention can be incorporated is the mass suspension route. Typically, a polymer is recovered by removing polymerizing material from a reactor either continuously or batchwise, devolatilizing the polymer to remove traces of nonpolymerized material, and usually chopping or grinding the polymer into con-

I claim:
1. A method for producing a translucent, impact resistant polymer comprising:
   a. adding to a polymerization feedstock, comprising 2 to 20% polybutadiene or styrene-butadiene rubber dissolved in a vinyl aromatic, an effective amount between 0.005 to 0.5 weight percent of an additive selected from the group consisting of 1,2-dibromo-2-phenylpropane and methyl-2,3-dibromo-3-phenylpropionate;
   b. polymerizing the feedstock; and c. recovering the polymer,
whereby the Izod value of the polymer is at least 0.6 and the translucency index of the polymer is at least 7.

2. The method of claim 1 where the vinyl aromatic monomer is styrene monomer.

3. The method of claim 2 where the feedstock is polymerized using the mass thermal polymerization technique.

4. The method of claim 3 whereby the rubber is a solution polybutadiene rubber.

5. The method of claim 3 wherein the additive is 1,2-dibromo-2-phenylpropane.

6. The method of claim 5 where between 0.005 and 0.1% of 1,2-dibromo-2-phenylpropane is added to the feedstock.

7. The method of claim 5 where about 0.008% of 1,2-dibromo2-phenylpropane is added to the feedstock.

8. A translucent, impact resistant polystyrene with an Izod value of at least 0.6 and a translucency index of at least 7 containing from 2 to 20% of a polybutadiene or styrene-butadiene rubber and from 0.005 to 0.5% of an additive selected from the group consisting of 1,2-dibromo-2-phenylpropane and methyl-2,3-dibromo-3-phenylpropionate.

9. The polystyrene of claim 8 which contains from 0.005 to 0.1% of 1,2-dibromo-2-phenylpropane.

10. The polystyrene of claim 9 where the rubber is a solution polybutadiene rubber.

* * * * *

UNITED STATES PATENT OFFICE
CERTIFICATE OF CORRECTION

Patent No. 3,957,915                          Dated May 18, 1976

Inventor(s) James Spanswick

It is certified that error appears in the above-identified patent and that said Letters Patent are hereby corrected as shown below:

Column 7, line 9, "whereby" should read -- wherein --.

Column 8, line 2, "1,2-dibromo2-phenylpropane" should read -- 1,2-dibromo-2-phenylpropane --.

Table I, run 6, "$\leq 50$" should read -- $> 50$ --.

Signed and Sealed this

Second Day of November 1976

[SEAL]

Attest:

RUTH C. MASON                      C. MARSHALL DANN
*Attesting Officer*                  *Commissioner of Patents and Trademarks*